United States Patent [19]

Huijer et al.

[11] Patent Number: 4,791,514
[45] Date of Patent: Dec. 13, 1988

[54] MAGNETIC RECORDING DEVICE WITH ROTATING HEAD

[75] Inventors: Ernst Huijer, Orsay; Jean C. Lehureau, Ste. Genevieve des Bois; Claude Monlouis, St. Arnould en Yvelines, all of France

[73] Assignee: Thomson-CSF, Paris, France

[21] Appl. No.: 889,882

[22] Filed: Jul. 28, 1986

[30] Foreign Application Priority Data

Jul. 26, 1985 [FR] France ................................ 8511499

[51] Int. Cl.⁴ ............................................ G11B 21/04
[52] U.S. Cl. .................................................. 360/108
[58] Field of Search ........................................ 360/108

[56] References Cited

U.S. PATENT DOCUMENTS 2,800,384  7/1957  Parker .
2,909,616  10/1959 Marty .
3,081,381  3/1963  Merry .

FOREIGN PATENT DOCUMENTS 2135865  7/1971  Fed. Rep. of Germany .
3239306  7/1984  Fed. Rep. of Germany .
1107292  12/1955 France .
1112704  3/1956  France .
56-54620  5/1981  Japan ................................... 360/108
905740   9/1962  United Kingdom .

Primary Examiner—A. J. Heinz
Attorney, Agent, or Firm—Oblon, Fisher, Spivak, McClelland, & Maier

[57] ABSTRACT

The magnetic recording device with rotating head according to the invention comprises a magnetic recording medium, a cylindrical and rotating head, a fixed magnetic excitation circuit; the head comprising, on its surface, two movable pole pieces separated by a gap and each magnetically linked to an initial and a second magnetic circuit in the shape of a portion of a ring and providing a rotating joint to the passage of the magnetic flux, with the fixed, magnetic excitation circuit possessing an excitation coil that induces an magnetic field in a magnetic circuit having two fixed pole pieces, each magnetically coupled by a gap to one of the said rings.

Application: Video tape recorders in particular.

2 Claims, 6 Drawing Sheets

FIG_1
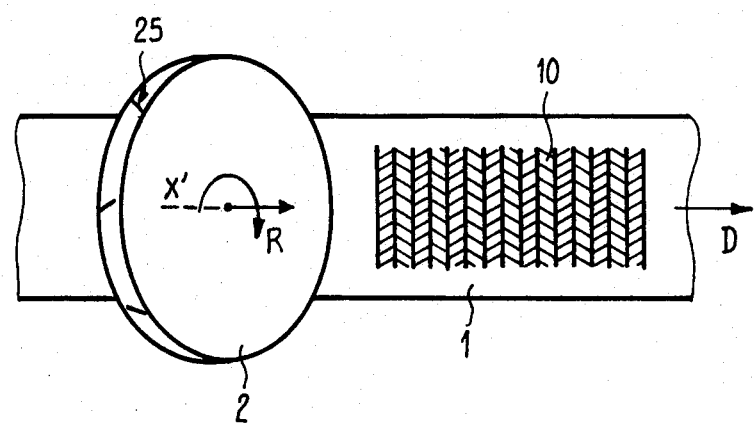
FIG_2
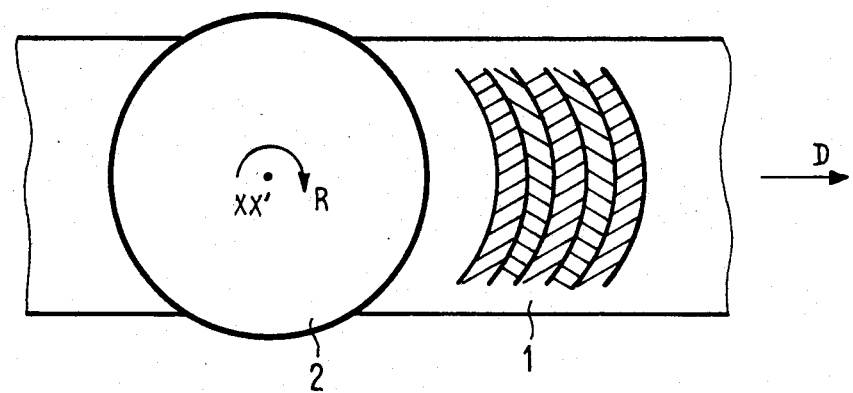

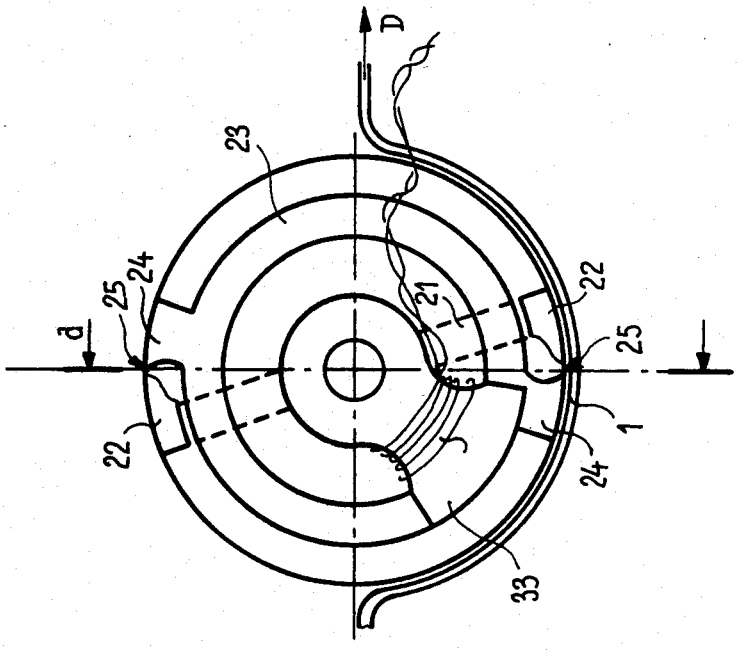
FIG._4
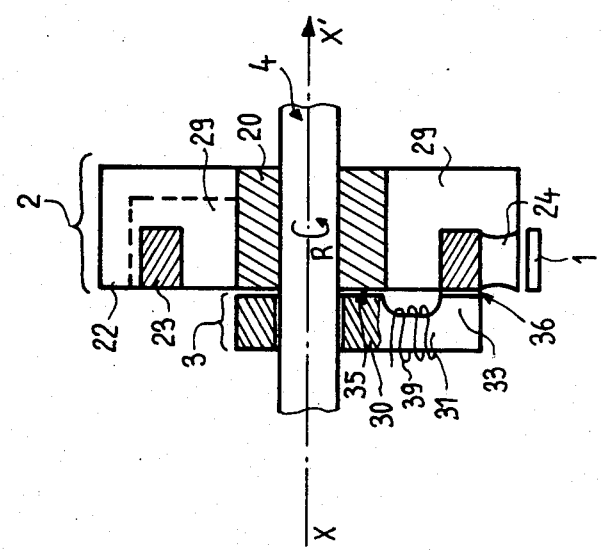
FIG._3

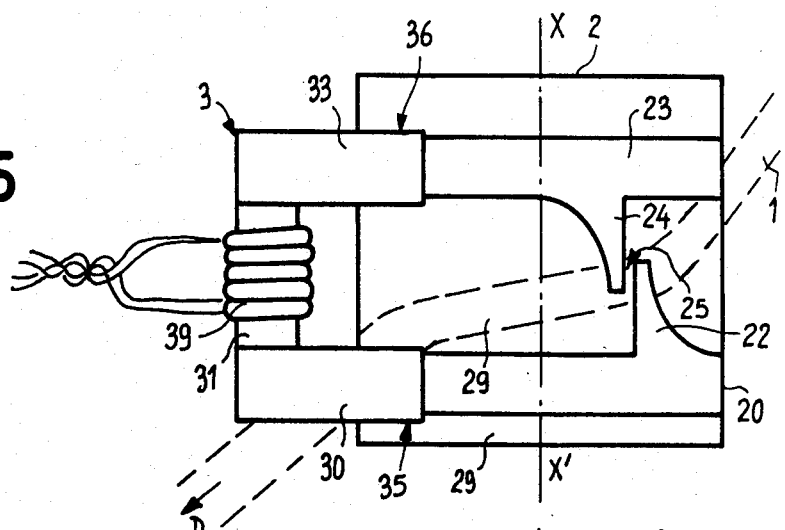
FIG_5
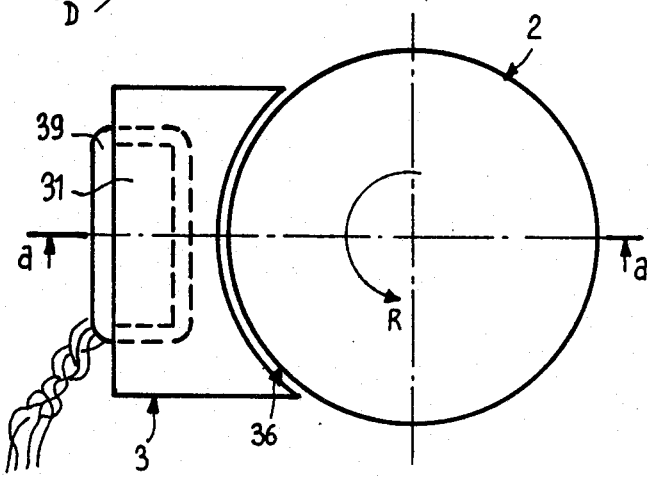
FIG_6
FIG_7
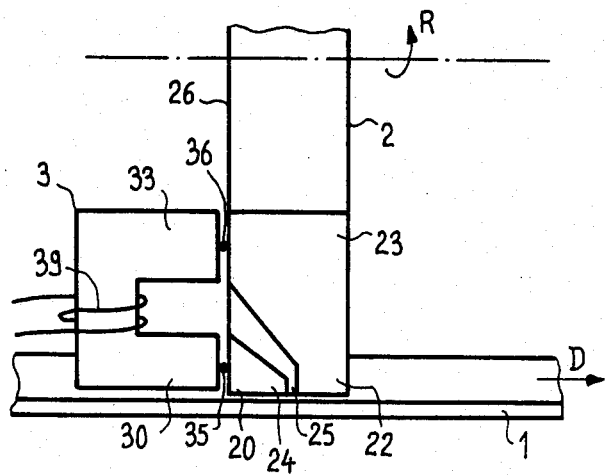
FIG_8
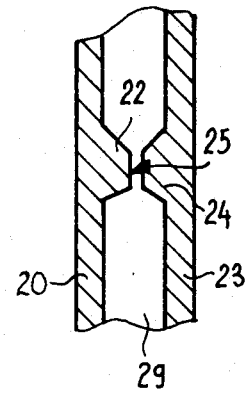

FIG_9
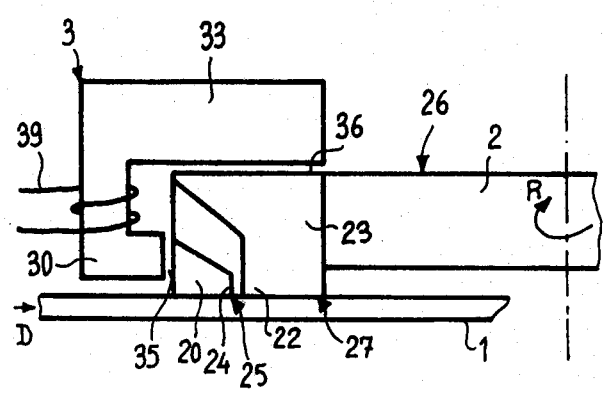
FIG_10
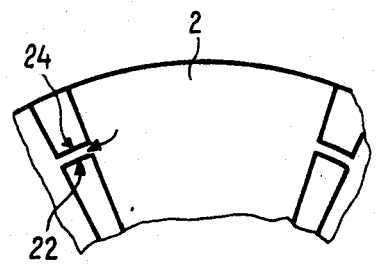
FIG_11
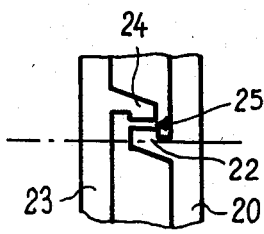
FIG_12
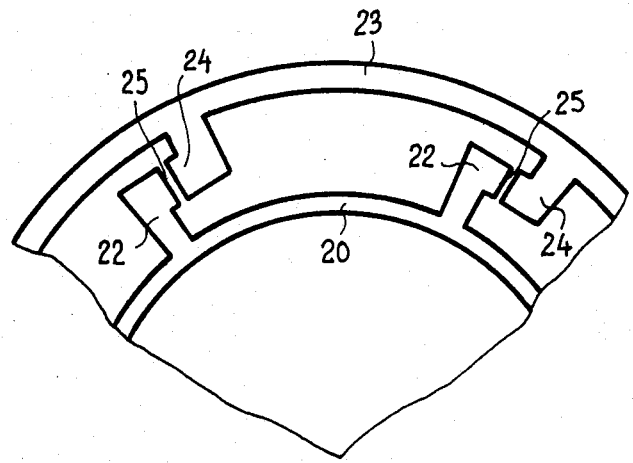

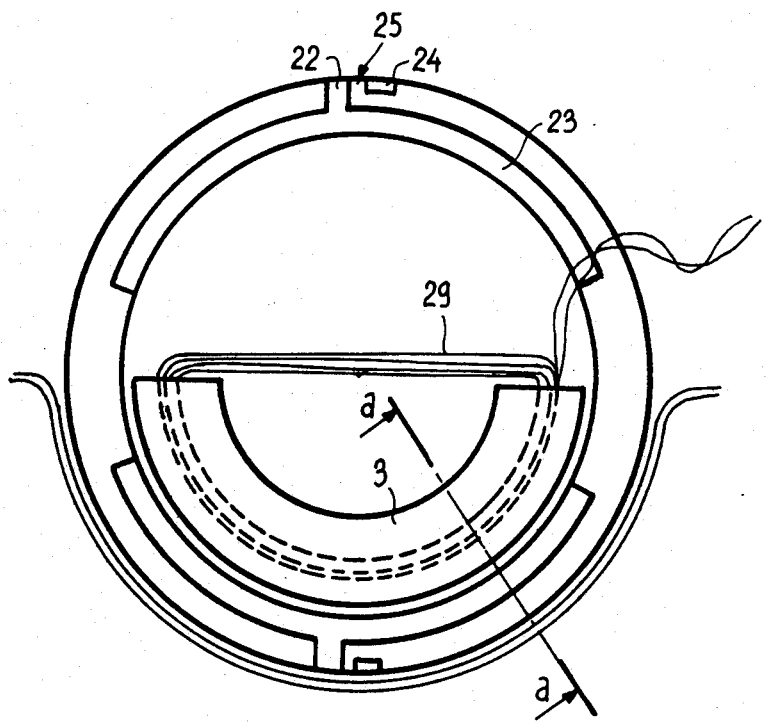
FIG_13
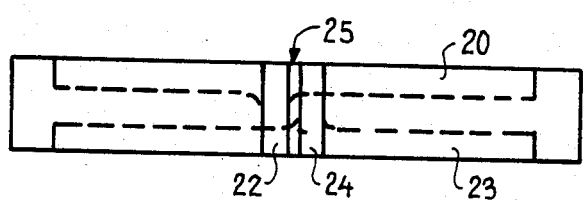
FIG_14
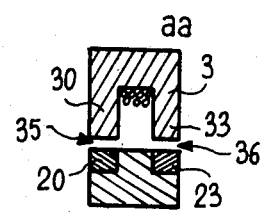
FIG_15
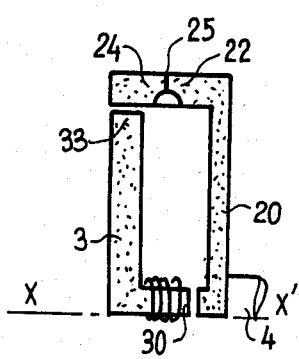
FIG_16
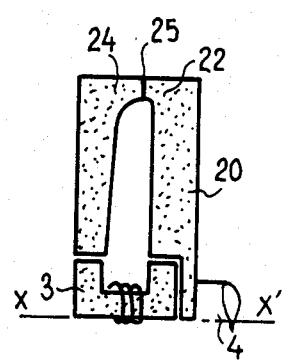
FIG_17
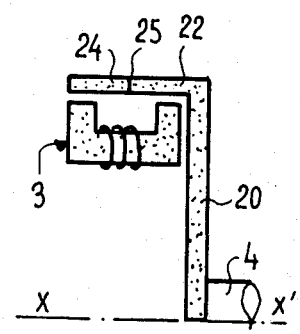
FIG_18

FIG_19
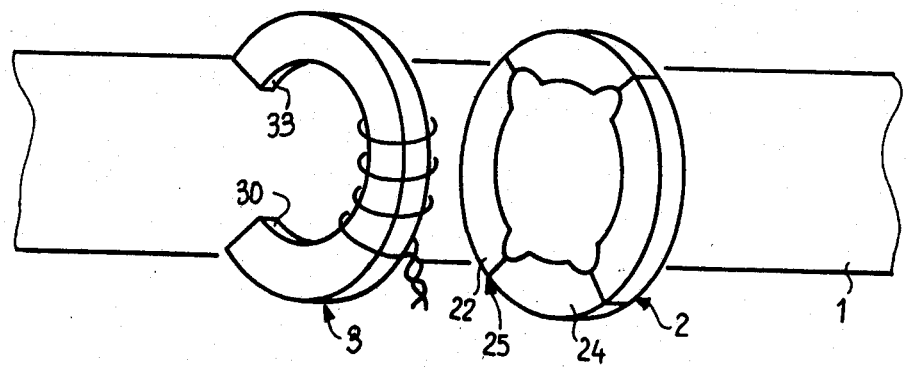
FIG_20
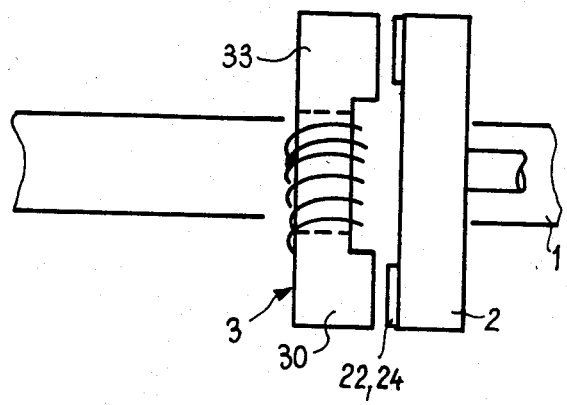
FIG_21
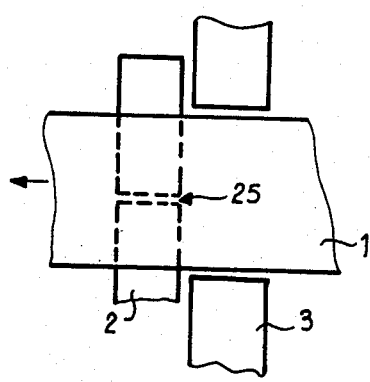
FIG_22
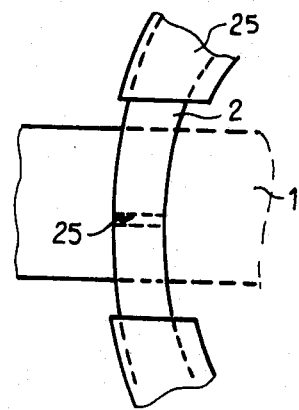

MAGNETIC RECORDING DEVICE WITH ROTATING HEAD

BACKGROUND OF THE INVENTION

1. Field of the Invention

The invention relates to a magnetic recording device with a fixed excitation rotating head which can especially be used in magnetic tape recording equipment such as video tape recorders in which the recordings are made in the form of lines of data arranged crosswise to the direction in which the tape runs.

2. Discussion of Background

Such a head can be used to record (write and/or read) analog or digital signals on a tape or any other magnetic medium as, for example, in a video tape recorder. A major feature of magnetic heads of this type is that the recording is done on the tape through mechanical motion in two dimensions: the running of the tape and a scanning operation by a rotating part.

It is known in the technology that high-velocity and high-density recording is done by rotating drums on which there are several magnetic heads which scan the tape along parallel tracks whose direction is oblique in relation to the length of the tape.

The heads are excited by means of a transformer whose magnetic circuit may be partly rotating and partly fixed.

Heads are also known in which the gap is formed by a fixed pole and a rotating pole.

The object of the invention relates to a configuration of a set of magnetic heads, the gaps of which are on a cylindrical part which can rotate and which have one (or more) fixed, common coils.

The advantage of the invention presented is that it eliminates the coils of the heads of the rotating drum. A set of heads of this type costs less to manufacture and is also less bulky.

As compared to a head where the gap is formed by a fixed pole and a rotating pole, the head according to the invention has the advantage that the width of the gap is not limited by the mechanical motion of one of the poles, which would necessitate a substantial distance between the poles.

It is therefore possible to make very narrow gaps and thus maintain high recording resolution.

In the invention, the gaps that separate the fixed part from the rotating part can be made in such a way that the efficiency of the head is not reduced. To this end, the area of the gaps is increased so as to diminish their reluctance. Moreover, a magnetic lubricant can be put in these gaps, for example, a product commercially known under the trademark of "Ferrofluid".

SUMMARY OF THE INVENTION

This is why the invention relates to a magnetic recording device with a rotating head comprising a magnetic recording medium, a cylindrical and rotating recording head, comprising also a fixed magnetic excitation circuit with the head comprising, on its surface, two movable pole pieces separated by a gap, each magnetically linked to an initial and a second magnetic circuit where each magnetic circuit is shaped lika a partial ring that provides a rotating link for the passage of the magnetic flux, the magnetic excitation circuit possessing an excitation coil which induces a magnetic field in a magnetic circuit that has two fixed pole pieces, each of which is magnetically coupled by a gap to the said rings.

BRIEF DESCRIPTION OF THE DRAWINGS

The various objects and characteristic features of the invention will be given in detail in the description that follows where reference will be made to the appended figures, namely:

FIGS. 1 and 2 representing simplified diagrams of modes of recording on magnetic tapes;

FIGS. 3 and 4 representing an example of a mode of embodiment of a head according to the invention wherein the fixed poles are laid out along a plane surface of the head and the movable poles along the cylindrical, peripheral surface of the head;

FIGS. 5 and 6 representing an example of a mode of embodiment of a head according to the invention wherein the fixed poles are set close to the cylindrical, peripheral surface of the head with the movable poles flush with this peripheral surface;

FIGS. 7 and 8 representing an alternative embodiment of the head represented in FIGS. 3 and 4;

FIGS. 9 and 10 representing alternative embodiments of the head according to the invention represented in FIGS. 5 and 6;

FIGS. 11 and 12 representing alternative embodiments of the movable poles according to the invention;

FIGS. 13, 14 and 15 representing an example of an embodiment of a head according to the invention wherein the fixed poles are located inside the head;

FIGS. 16 to 18 representing alternatives of an embodiment of a head according to the invention represented in FIGS. 13 to 15;

FIGS. 19 and 20 representing an example of an embodiment of the head according to the invention wherein the movable poles are made by depositing a layer of magnetic material on a cylindrical support made of glass;

FIGS. 21 and 22 representing alternative embodiments of the invention.

DETAILED DESCRIPTION OF THE INVENTION

The general configuration of the invention is a rotating drum on which there are a number of magnetic circuits similar to those of a simple, conventional head, but with the coil part removed. This coil part is in a fixed position near the drum.

In this way, two flux-coupling gaps are created between the fixed part and the rotating part. To increase the efficiency of the head, the reluctance of the gaps should be diminished by making the areas of both gaps as large as possible and the difference as small as possible. Moreover, the gaps can be filled with a magnetic lubricant.

Thus, the coil excites one recording gap at a time. These recording gaps are coupled to the coil one after the other and they are excited successively in such a way that a gap is active while it scans the tape.

The invention can be applied in many ways; three main parameters are identified:

The direction in which the recording gap is pointed with respect to the scanning direction;

The direction of the rotational axis of the drum with respect to the run of the tape;

The position and direction of each of the two coupling gaps. These last parameters being given, the position and direction of the fixed coil are practically determined.

There are other parameters, like the number of recording gaps, which are less fundamental.

Depending on the direction of the recording head with respect to the direction in which the tape runs, different types of recording are obtained.

FIG. 1 shows a head 2, the rotational axis XX' of which is parallel to the running direction D of a tape 1. In rotating in the direction R, the recording head records, by magnetic gaps 25, data tracks such as 10 on the tape 1. The movement of the tape 1 in the direction D controls the recording of successive tracks. Depending on the speed at which the tape 1 moves, the tracks 10 are inclined in varying degrees with respect to the running direction of the tape.

In the case of FIG. 2, the rotational axis XX' of the head 2 is set perpendicularly to the recording plane of the tape 1. The recorded data tracks are then laid out in arcs of circles that are parallel because the tape 1 moves in the direction D.

With reference to FIGS. 3 and 4, we shall describe an example of an embodiment of the recording head according to the invention.

The cylindrically-shaped recording head 2 with an axis XX' comprises an initial central ring 20 made of magnetic material such as ferrite or NiFe, and a second external, concentric ring made of identical material. At the cylindrical periphery of the recording head, there are two pairs of diametrically opposite pole pieces 22, 24. The two pole pieces of each pair are separated by a gap 25. One pole piece 22 of a pair is linked magnetically by an arm 21 to the central ring 20. The other pole piece 24 is magnetically united with the second outer ring 23. To complete the cylindrical shape of the recording head, the free spaces such as 29 between the rings 20 and 23, the arms 21 and the pole pieces 22, 24, are filled with a material, like aluminium, that stops high-frequency induction effects from going through.

The central ring 20 is force-fitted on a driving shaft 4 by which it is possible to apply a rotational movement R to the head 2 around the axis XX'.

An excitation head 3 is mounted on the driving shaft 4. This excitation head has an excitation circuit 31 around which is mounted a magnetic excitation coil 39 and two pole pieces 30 and 33.

The excitation head is in a fixed position. The pole pieces 30 and 33 are respectively near the rings 20 and 23. The recording head 2 rotates with respect to the excitation head 3 so that the gaps 35 and 36 that exist between the pole pieces 30 and 33 and the rings 20 and 23 remain constant.

A magnetic tape 1 fits the shape of a part of the cylindrical rim of the head 2 and moves in the direction of the arrow D (see FIG. 4). In this way, the movement of the tape in the direction of the the arrow D, linked to the rotation of the recording head in the direction of the the arrow R, provides for high-density recording on the tape.

By making this kind of recording head, it is possible to obtain very narrow gaps 25 between movable pole pieces 22 and 24. The gaps 35 and 36 between the fixed pole pieces 30 and 31 and the rings 20 and 23 should be sufficient to prevent friction. To reduce the reluctance of these gaps 35 and 36, fixed pole pieces 30 and 33 with large areas should be provided for. Thus, for example, a gap 25, demarcated by the movable pole pieces 22 and 24, has a thickness of 0.3 m and a cross-section of 50 by 50 m. In contrast, a gap existing between a fixed pole piece 30 or 33 and a ring 20 or 23 has a thickness of 20 m and a minimum cross-section of 1 mm2.

With reference to FIGS. 5 and 6, we shall describe another example of a recording head built according to the invention.

The movable part of the head 2 has two cylindrical rings 20 and 23 which have the same dimensions. Each ring is fitted with at least one of the pole pieces 21, 24, such that two pole pieces of the two rings define a gap 25. The entire assembly is molded in a magnetically insulating material such as aluminium so as to form a drum.

The fixed excitation part 3 has an excitation circuit 31 on which an excitation coil 39 is mounted and which forms one piece with the fixed pole pieces 30 and 33. These pole pieces are each placed at the level of a ring 20 or 23 and, as is shown in FIG. 6, fit the cylindrical shape of the rings 20 and 23.

The movable part 2 rotates in the direction of the arrow R, a magnetic tape 1 moves in the direction of the arrow D fitting the shape of a part of the external cylindrical surface of the movable part 2. It is thus possible to carry out high-density recordings as in known instruments of the video tape-recorder type.

By making such a head, a very narrow gap 25 can be obtained. The reluctance of the gaps 35 and 36 between the fixed pole pieces 30 and 33 and the rings 20 and 23 is reduced to the minimum by increasing the size of the pole pieces 30 and 33 along the rim of the rings 20 and 23.

With reference to the FIGS. 7 and 8, we shall now describe an alternative embodiment of the recording head according to the invention.

According to this alternative, the movable part 2 of the head is made up of an aluminium drum 29 comprising two rings 20 and 23 made of magnetic material. The ring 20 is flush with a side 26 of the movable part and comprises pole pieces 24 on the cylindrical rim. The ring 23 comprises a circular side that is concentric with the ring 20 and is flush with the same side 26 of the movable part 22 as the ring 20. It also has pole pieces 22 facing the pole pieces 24 and determining the gaps 25. For ease of construction, the ring 23 can link the two sides of the mobile part 2. The pole pieces 22 and 24 may consist of an indentation made on the rings 20 and 23 as shown in FIG. 8.

The fixed part 3 of the head has both its pole pieces 30 and 33 placed along the flank 26 of the movable part 2, facing the rings 20 and 23.

According to another alternative embodiment represented in FIGS. 9 and 10, the ring 20 is flush with the cylindrical rim and has pole pieces 24 that are flush with a flank 27 of the movable part or of the drum 2. The other ring 23 is flush with the other flank 26 of the drum 2 and has pole pieces that are flush with the flank 27 of the drum. The fixed part 3 bearing the excitation coil 39 has a pole piece 30 placed near the cylindrical rim facing the ring 20 while the other pole piece 23 is near the flank 26, facing the ring 23.

In this alternative embodiment, the tape 1 moves along a plane parallel to the flank 27 of the drum 2. The tracks recorded on the tape are then arcs of circles.

The FIGS. 11 and 12 represent other modes of embodiment of the movable pole pieces 22 and 24 and their gap 25.

The FIG. 11 represents a mode of embodiment in which the movable pole pieces are at the cylindrical rim of the movable part 2 and are made up of teeth connected to the rings 20 and 23.

The FIG. 12 represents an embodiment in which the movable pole pieces are on a flank of the movable part. They are made in a way similar to the pole pieces of FIG. 11.

With reference to FIGS. 13, 14 and 15, we shall now describe an example of an embodiment of the invention wherein the rotating part 2 is a hollow drum.

This rotating part has two inner rings 20 and 23 (or parts of rings as shown in FIG. 13) placed against the flanks of the drum and flush with the inner cavity of the drum. Pole parts 22 and 24, respectively linked to the rings 20 and 23, are flush with the cylindrical rim of the drum and determine gaps 25 at this rim.

The fixed part 2 of the head is housed inside the drum. This fixed part fits the circular shape of the drum and has a U-shaped cross-section, as shown in FIG. 15, in which the excitation coil 39 is housed. The ends of the U shape constitute the fixed pole pieces 30 and 33 and are placed so that they face the rings 20 and 23, being separated from these rings by gaps 35 and 36.

The FIGS. 16 to 18 represent alternative embodiments of the head shown in FIGS. 13 to 15. According to these alternatives, one of the rings 20 is mounted on a driving shaft 4 along the axis XX'.

According to the FIG. 16, the fixed part 3 is also mounted along the axis XX'. A fixed pole piece 30 is located along this axis while the pole piece 33 is located towards the rim of the movable part.

According to the FIGS. 17 and 18, the fixed part 3 has a shape similar to that of the fixed parts in figures 13 to 15. According to the FIG. 17, the fixed part 3 is set along the axis XX' while according to the FIG. 18, the fixed part 3 is set off the axis XX' towards the inner part of the drum of the movable part 2.

The FIGS. 19 to 22 represent examples of embodiments in which the movable part is made in the shape of a disk made of material such as glass while the movable pole pieces 22, 24 are made by using layers of a material such as NiFe. These movable pole pieces then take the shape of circular, metallized bands arranged on a flank of the disk 2.

The fixed part 3 of the head has the general shape of a part of a torus, the external dimension of which is equal to the diameter of the disk 2. At the open ends of the torus are the pole pieces 30 and 33. This fixed part is attached to the flank of the disk 2 in such a way that the rotating disk brings the metallized bands successively before the pole pieces 30 and 33 and so that the various gaps 25 run between the fixed pole pieces 30 and 33. The tape 1 moves under the fixed pole pieces 30 and 33 and the passage of the various gaps determines the recording of magnetic data.

The FIG. 21 represents a view from the top showing an arrangement of the gap 25 parallel to the direction of the movement D of the tape 1.

The FIG. 22 is a view similar to that of FIG. 21, the movable part or disk 2 being set in a plane parallel to the plane of the tape 1 and then determining the circular recording tracks.

What is claimed is:

1. A magnetic recording device having a rotating head comprising:
   a magnetic recording medium;
   a cylindrical rotating head;
   a fixed magnetic excitation circuit;
   two movable mounted pole pieces on the surface of said cylindrical rotating head wherein said two movable pole pieces are separated by a first gap and are each linked magnetically to a first and a second magnetic circuit wherein each of said first and second magnetic circuit have the shape of a portion of a ring and wherein said first and second magnetic circuit provide a rotation link for the passage of magnetic flux;
   said fixed magnetic excitation circuit including an excitation coil which induces a magnetic field in a magnetic circuit having two fixed pole pieces wherein each of said fixed pole pieces are magnetically coupled to said rings by a second and third gap respectively; and
   wherein said first magnetic circuit is located on a circular surface of said rotating head and wherein said second magnetic circuit and said first gap are located on a plane surface of said rotating head.

2. The magnetic recording device according to claim, 1 wherein said first gap and said first and second magnetic circuits are located on the circumferential surface of said rotating head.

* * * * *